(12) United States Patent
Lin et al.

(10) Patent No.: US 11,722,976 B2
(45) Date of Patent: Aug. 8, 2023

(54) TIME CODE SYNCHRONIZATION METHOD

(71) Applicant: APUTURE IMAGING INDUSTRIES CO., LTD., Shenzhen (CN)

(72) Inventors: Wulong Lin, Shenzhen (CN); Fuping Liu, Shenzhen (CN)

( * ) Notice: Subject to any disclaimer, the term of this patent is extended or adjusted under 35 U.S.C. 154(b) by 0 days.

(21) Appl. No.: 17/564,336

(22) Filed: Dec. 29, 2021

(65) Prior Publication Data

US 2022/0386258 A1 Dec. 1, 2022

(30) Foreign Application Priority Data

May 31, 2021 (CN) .......................... 202110600447.2

(51) Int. Cl.
*H04W 56/00* (2009.01)
*H04L 7/00* (2006.01)

(52) U.S. Cl.
CPC ....... *H04W 56/0015* (2013.01); *H04L 7/0066* (2013.01); *H04W 56/002* (2013.01); *H04W 56/005* (2013.01)

(58) Field of Classification Search
CPC .......... H04W 56/0015; H04W 56/002; H04W 56/005
See application file for complete search history.

(56) References Cited

U.S. PATENT DOCUMENTS

| 2008/0122986 A1* | 5/2008 | Diederichsen | ..... H04N 21/2343 348/E5.057 |
| 2010/0231791 A1* | 9/2010 | Prestenback | ............. H04N 5/76 348/565 |
| 2011/0291723 A1* | 12/2011 | Hashimoto | ...... H04N 21/43072 327/161 |
| 2013/0151855 A1* | 6/2013 | Petrovic | ............. H04N 21/4627 713/176 |
| 2014/0240604 A1* | 8/2014 | Toba | ........................ H04N 5/44 348/723 |
| 2017/0142672 A1* | 5/2017 | Barker | .................. H04W 56/00 |
| 2017/0366287 A1 | 12/2017 | Zeng et al. | |

(Continued)

FOREIGN PATENT DOCUMENTS

| CN | 102355319 A | 2/2012 |
| CN | 104023385 A | 9/2014 |
| CN | 112104435 A | 12/2020 |

OTHER PUBLICATIONS

The First Office Action and Search Report dated Aug. 20, 2021, for Aputure Imaging Industries Co., Ltd., from China Application No. 202110600447.2 and Its Translation of Office Action Into English (6 pages).

(Continued)

*Primary Examiner* — Gary Mui (57) ABSTRACT

The embodiment of the present disclosure provides a time code synchronization method, which includes following steps of: determining a target master node and one or more target slave nodes of a network system among the plurality of nodes; periodically sending a data packet to the one or more target slave nodes by the target master node, wherein the data packet includes a first time code and serial number information of the target master node; compensating the first time code according to the serial number information to obtain a second time code, and synchronizing the second time code by the one or more target slave nodes.

9 Claims, 4 Drawing Sheets

```
determining a target master node and one or more target slave nodes of the      — 11
network system among the plurality of nodes
                                ↓
upon determining the target master node and the one or more target slave
nodes of the network system, periodically sending a data packet to the one      — 12
or more target slave nodes by the target master node, wherein the data
packet comprises a first time code and a serial number information of the
target master node
                                ↓
compensating the first time code by the one or more target slave nodes
according to the serial number information to obtain a second time code,        — 13
and synchronizing the second time code by the one or more target slave
nodes
```

(56) References Cited

U.S. PATENT DOCUMENTS

| | | | | |
|---|---|---|---|---|
| 2018/0332218 | A1* | 11/2018 | Yoshimura | H04N 23/90 |
| 2019/0199890 | A1* | 6/2019 | Saito | H04N 5/04 |
| 2021/0075532 | A1* | 3/2021 | Anand | H04J 3/0697 |
| 2021/0250884 | A1* | 8/2021 | Iyer | H04W 56/0045 |
| 2022/0263593 | A1* | 8/2022 | Mochida | H04J 3/14 |
| 2023/0028255 | A1* | 1/2023 | Shah | H04J 3/0667 |

OTHER PUBLICATIONS

The Notice of Allowance and Search Report dated Sep. 6, 2021, for Aputure Imaging Industries Co., Ltd., from China Application No. 202110600447.2 and Its Translation of Notice of Allowance Into English (2 pages).

* cited by examiner

```
┌──────────────────────────────────────────────────────────────┐
│ determining a target master node and one or more target slave│ ─── 11
│       nodes of the network system among the plurality of     │
│                           nodes                              │
└──────────────────────────────────────────────────────────────┘
                              │
                              ▼
┌──────────────────────────────────────────────────────────────┐
│ upon determining the target master node and the one or more  │
│ target slave nodes of the network system, periodically       │
│ sending a data packet to the one or more target slave nodes  │ ─── 12
│ by the target master node, wherein the data packet comprises │
│ a first time code and a serial number information of the     │
│                     target master node                       │
└──────────────────────────────────────────────────────────────┘
                              │
                              ▼
┌──────────────────────────────────────────────────────────────┐
│ compensating the first time code by the one or more target   │
│ slave nodes according to the serial number information to    │ ─── 13
│ obtain a second time code, and synchronizing the second time │
│ code by the one or more target slave nodes                   │
└──────────────────────────────────────────────────────────────┘
```

FIG. 6 upon determining the target master node and the one or more target slave nodes of the network system, generating by the target master node an initial data packet, the initial data packet including a first time code and an initial serial number information of the target master node — 71 within a preset time period, updating periodically the initial serial number information by the target master node to obtain the serial number information — 72 updating the initial data packet by the target master node according to the serial number information to obtain the data packet — 73 periodically sending the data packet to the one or more target slave nodes by the target master node — 74

FIG. 7 determining a delay time relative to the first time code by the one or more target slave nodes according to the serial number information and the preset buffer time — 81 obtaining a second time code by the one or more target slave nodes according to the delay time and the first time code — 82 updating own time of the one or more target slave nodes to the second time code according to the second time code so as to synchronize the second time code — 83

TIME CODE SYNCHRONIZATION METHOD

CROSS REFERENCE TO RELATED APPLICATION

This application claims priority of Chinese Application No. 202110600447.2 filed on May 31, 2021, which of title is "TIME CODE SYNCHRONIZATION METHOD AND NETWORK SYSTEM", the entire disclosure of which is incorporated by reference in this application.

FIELD OF INVENTION

The present disclosure relates to a field of wireless communication, in particular to a time code synchronization method.

BACKGROUND OF INVENTION

Time code is time coding recorded for each (frame of) image when a camera records an image signal assigning a number to each frame in a video to indicate hour, minute, second, and frame number, including a value of hour: minute: second: frame. Therefore, as long as the time code is remembered, image position in each frame can be easily found.

In scenes such as traditional film crews, TV commercials, reality shows, small and medium-sized crews, and student crews and the like, a time code device is needed to match with machines such as a video camera and a sound recorder, but a plurality of video cameras and audio recorders often exist in a same crew, and time code information of multiple machines needs to be synchronized. And it will cause relatively large errors, and accordingly, large workloads, to set same time code information for each machine artificially

SUMMARY OF INVENTION

Embodiments of the present disclosure provide a time code synchronization method, aiming at solving a problem of the prior art that wireless synchronization of time code is inaccurate.

Embodiments of the present disclosure provide a time code synchronization method applied to a network system, wherein the network system comprises a plurality of nodes, and the method includes:

determining a target master node and one or more target slave nodes of the network system among the plurality of nodes;

upon determining the target master node and the one or more target slave nodes of the network system, periodically sending a data packet to the one or more target slave nodes by the target master node, wherein the data packet comprises a first time code and a serial number information of the target master node; and compensating the first time code by the one or more target slave nodes according to the serial number information to obtain a second time code, and synchronizing the second time code by the one or more target slave nodes.

Further, the plurality of nodes includes a plurality of initial master nodes, any one of the plurality of initial master nodes corresponds to one of initial network systems, and each of the initial network systems includes an initial master node and at least one slave node;

determining a target master node and one or more target slave nodes of the network system among the plurality of nodes, includes:

receiving a first pairing information sent by a mobile terminal by the plurality of nodes;

determining respectively by the plurality of nodes whether they themselves are a target master node or not according to the first pairing information, wherein the target master node is the initial master node;

sending a dissolution command to other initial master nodes by the target master node, wherein the other initial master nodes are other initial master nodes among the plurality of initial master nodes except the target master node; and updating the other initial master nodes as first slave nodes according to the dissolution command;

wherein one of the initial network systems corresponding to the target master node is a target network system, and the one or more target slave nodes include the first slave node, a second slave node in the target network system, and a third slave node corresponding to the first slave node.

Further, upon determining the target master node and the one or more target slave nodes of the network system among the plurality of nodes, the method further includes:

receiving a second pairing information from the target master node by the one or more target slave nodes to pair the target master node with the one or more target slave nodes to obtain a new network system.

Further, the method further includes:

sending a verification information to the one or more target slave nodes by the target master node to verify whether the new network system is successfully established.

Further, upon determining the target master node and the one or more target slave nodes of the network system, the periodically sending a data packet to the one or more target slave nodes by the target master node includes:

upon determining the target master node and the one or more target slave nodes of the network system, generating by the target master node an initial data packet, the initial data packet including a first time code and an initial serial number information of the target master node;

within a preset time period, updating periodically the initial serial number information by the target master node to obtain the serial number information;

updating the initial data packet by the target master node according to the serial number information to obtain the data packet; and periodically sending the data packet to the one or more target slave nodes by the target master node;

wherein any two adjacent data packets are sent with a preset buffer time interval;

the data packet includes the first time code and the serial number information of the target master node.

Further, the compensating the first time code by the one or more target slave nodes according to the serial number information to obtain a second time code and synchronizing a second time code by the one or more target slave nodes includes:

determining a delay time relative to the first time code by the one or more target slave nodes according to the serial number information and the preset buffer time;

obtaining a second time code by the one or more target slave nodes according to the delay time and the first time code; and updating own time of the one or more target slave nodes to the second time code according to the second time code so as to synchronize the second time code.

Further, the method further includes: receiving a synchronization confirmation information from the one or more target slave nodes by the target master node to determine that the one or more target slave nodes successfully synchronizes the second time code;

wherein, the synchronization confirmation information includes the serial number information.

Further, the method further includes:

if receiving a synchronization confirmation information from the one or more target slave nodes by the target master node, stopping sending the data packet by the target master node within the preset time period.

Further, determining the target master node and the one or more target slave nodes of the network system among the plurality of nodes includes:

randomly selecting a node among the one or more target slave nodes as a new target master node if the target master node in the network system is disconnected.

Further, the first time code in the data packet sent by the target master node is the same, and the serial number information is different.

In the time code synchronization method provided by embodiments of the present disclosure, a master node periodically sends to one or more slave nodes the data packet including the first time code and the serial number information that needs to be synchronized, the one or more slave nodes determine actual corresponding second time code when the one or more slave nodes receive the time code according to the serial number information, and the slave node synchronizes the second time code to realize time code synchronization between the master node and the one or more slave nodes. Therefore, a problem can be effectively avoided that time codes cannot be synchronized due to the fact that time code information is lost when the master node performs time code synchronization.

DESCRIPTION OF DRAWINGS

The accompanying figures to be used in the description of embodiments of the present disclosure will be described in brief to more clearly illustrate technical solutions of the embodiments. It is obvious that the accompanying figures described below are only part of embodiments of the present disclosure. Those skilled in the art can derive further figures without making any inventive efforts from these figures.

DETAILED DESCRIPTION OF PREFERRED EMBODIMENTS

Technical solutions in embodiments of the present disclosure will be clearly and completely described below with reference to accompanying figures in the embodiments of the present disclosure. It is obvious that the described embodiments are only a part of the embodiments of the present disclosure, and not all of the embodiments. All other embodiments, which can be obtained by those skilled in the art from the embodiments given herein without making any creative effort, shall fall within a protection scope of the present disclosure.

In the description of the present disclosure, it should be understood that orientations or position relationships indicated by terms such as "center", "longitudinal", "lateral", "length", "width", "thickness", "upper", "lower", "front", "rear", "left", "right", "vertical", "horizontal", "top", "bottom", "inner", "outer", and the like are based on orientation or position shown by the accompanying figures, and are only for convenience of describing the present disclosure and simplifying the description, rather than indicating or implying that a device or element being referred to must have a particular orientation or position, or be constructed or operated in a particular orientation or position, and thus should not be construed as limiting the present disclosure. Furthermore, terms of "first", "second" are used for the purpose of describing only and are not to be construed as indicating or implying relative importance or implicitly indicating number of technical features indicated. Thus, features defined as "first", "second", may explicitly or implicitly include one or more of the described features. In the description of the present disclosure, "a plurality of" or "multiple" means two or more unless otherwise specifically defined.

In the present disclosure, a term "exemplary" is used to represent "serving as an example, illustration or description." Any embodiment described as "exemplary" in the present disclosure is not necessarily construed to be more preferable or more advantageous than other embodiments. In order to enable any person skilled in the art to implement and use the present disclosure, the following description is given. In the following description, details are listed for purpose of explanation. It should be understood that those of ordinary skill in the art will realize that the present disclosure can also be implemented without using these specific details. In other embodiments, well-known structures and processes will not be described in detail to avoid unnecessary details to obscure the description of the present disclosure. Therefore, the present disclosure is not intended to be limited to the embodiments shown, but is to be accorded the widest scope consistent with principles and features disclosed in the present disclosure.

The embodiment of the present disclosure provides a time code synchronization method. Detailed descriptions are given below.

The time code synchronization of the prior art is to connect a plurality of devices which need to be synchronized through an actual line, while the embodiments of the present disclosure provide a method for wirelessly synchronizing time codes. Specifically, by directly using time code devices or mobile phone applications (APP) and the like, a time code device or time code information of a mobile phone APP can be used to synchronize the time code information of other time code devices with one key in a network system, reducing error problems of setting time codes of a plurality of devices.

The time code device provided in the embodiments of the present disclosure may generally implement wireless communication by methods including, but not limited to, BLUETOOTH, WIFI, near-field communication (NFC), radio frequency identification (RFID), Zigbee (ZIGBEE), and the like. And each device may have a function of generating a time code to synchronize its own time code information to other devices.

Meanwhile, in the embodiment of the present disclosure, the network system comprises a plurality of nodes which include a master node and one or more slave nodes, the master node broadcasts a synchronous time code command to other slave nodes in a same network system, and the slave nodes realize time code synchronization after receiving the synchronous time code command.

Figure 1:
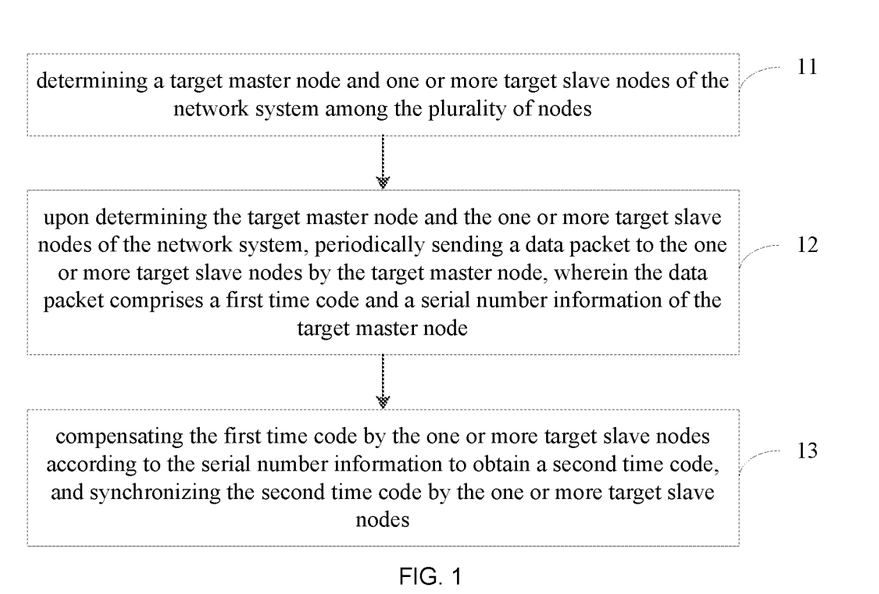
FIG. 1 is an exemplary flowchart illustrating a time code synchronization method according to an embodiment of the present disclosure.

An exemplary flowchart illustrating a time code synchronization method according to an embodiment of the present disclosure is shown in FIG. 1, which may include:

11, determining a target master node and one or more target slave nodes of the network system among the plurality of nodes.

Specifically, the network system provided in the embodiment of the present disclosure comprises a plurality of nodes, a target master node and a one or more target slave nodes in a certain network system need to be determined among the plurality of nodes, and the time code of the target master node will be synchronized to all the target slave nodes.

Figure 2:
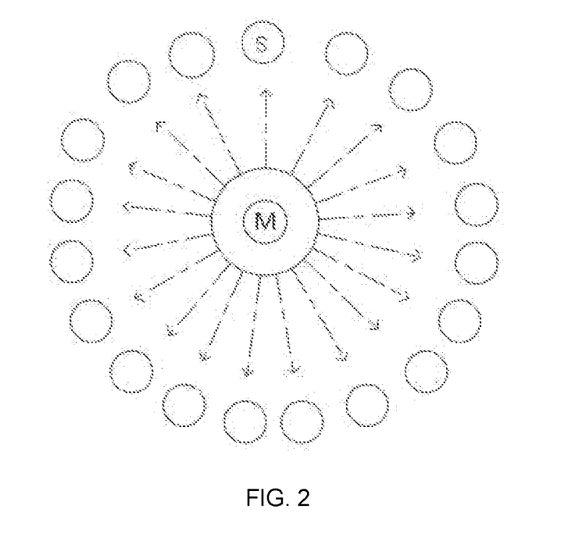
FIG. 2 is an exemplary diagram illustrating a network system according to an embodiment of the present disclosure.

An exemplary diagram illustrating a network system according to an embodiment of the present disclosure is shown in FIG. 2. A central point of the network system is a master node M, and points on a circular arc are slave nodes S. Meanwhile, the present disclosure aims at a broadcast communication mode. That is, there is no need to establish a master-slave connection relationship between nodes in the network system under the condition that no mobile phone APP is operated. Thus, in FIG. 2, there is no need to bind actual master-slave connection relationship between the master node M and the slave nodes S, and there may be only virtual master-slave relationship between the master node M and the slave nodes S. The master node M may send a broadcast command to the slave node S, and the broadcast command is received and analyzed by the slave nodes S.

In the network system shown in FIG. 2, the network system comprises only one master node M and a plurality of slave nodes S. The master node M is a target master node in the network system and has authority to broadcast commands, and the plurality of slave nodes S are target slave nodes and do not have authority to broadcast commands.

12, upon determining the target master node and the one or more target slave nodes of the network system, periodically sending a data packet to the one or more target slave nodes by the target master node, wherein the data packet comprises a first time code and a serial number information of the target master node.

After determining the target master node and the one or more target slave nodes of the network system, the target master node will periodically send a data packet to each target slave node so as to synchronize its time code to each target slave node in the network system.

The data packet actually sent by the target master node comprises the first time code and the serial number information which needs to be synchronized by the target master node. Since the target master node sends data packets periodically, corresponding serial number information in different data packets is also different.

13, compensating the first time code by the one or more target slave nodes according to the serial number information to obtain a second time code, and synchronizing the second time code by the one or more target slave nodes.

Because serial number information corresponding to different data packets is different, the serial number information can be utilized to compensate the first time code to determine a corresponding time when the one or more target slave nodes receive the data packet, that is, the second time code. The one or more target slave nodes synchronize the second time code, so that time code synchronization between the master node and the slave nodes is realized.

According to the time code synchronization method provided by the embodiment of the present disclosure, the master node periodically sends to the one or more slave nodes the data packet comprising the first time code and the serial number information that need to be synchronized, the slave node determines the actual corresponding second time code when the one or more slave nodes receive the time code according to the serial number information, and the slave node synchronizes the second time code, so that the time code synchronization between the master node and the one or more slave nodes is realized. Therefore, the problem is avoided that time codes cannot be synchronized due to the fact that time code information is lost when time code synchronization is performed between the master node and the one or more slave nodes.

Figure 3:
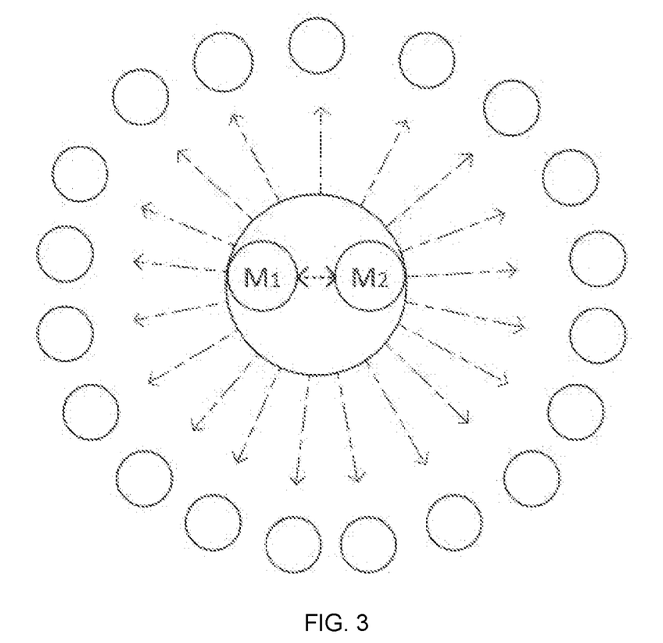
FIG. 3 is an exemplary diagram illustrating a network system according to another embodiment of the present disclosure.

An exemplary diagram illustrating a network system according to another embodiment of the present disclosure is shown in FIG. 3. In FIG. 3, the network system comprises two master nodes, M1 and M2 respectively, and either the master node M1 or the master node M2 may act as a target master node in the network system, and send data packets to all other target slave nodes.

It should be noted that, in the embodiment of the present disclosure, a device may serve as a master node M, and may also serve as a slave node S, and under the situation that no APP participates in operation, multiple master nodes or multiple groups of network systems are allowed to coexist in the network system.

Figure 4:
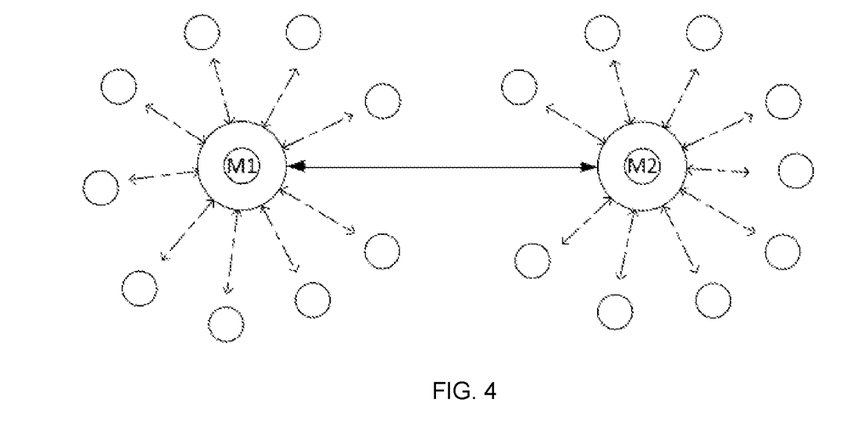
FIG. 4 is an exemplary diagram illustrating a network system according to another embodiment of the present disclosure.

As shown in FIG. 4, in the embodiment of the present disclosure, if there is no mobile phone APP participating in operation, the plurality of nodes may include multiple initial master nodes which may be in one network system or in multiple network systems. In some embodiments of the present disclosure, any one of the multiple initial master nodes corresponds to one of initial network systems, and each of the initial network systems includes one initial master node and at least one slave node. When there is a mobile phone APP involved in operation, there will be only one target master node in the network system, therefore, a master node and one or more slave nodes need to be determined.

Figure 5:
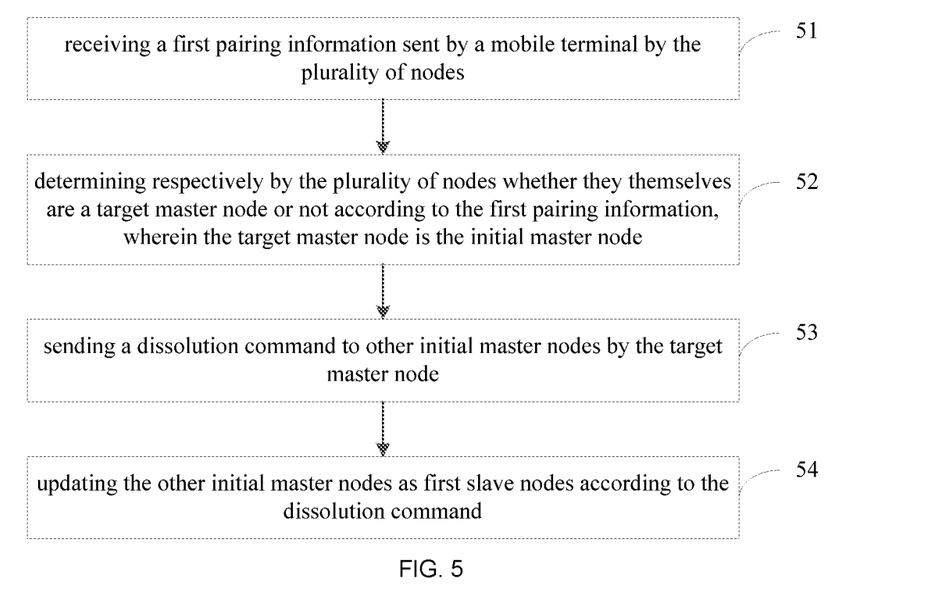
FIG. 5 is an exemplary flowchart illustrating determining a master node and one or more slave nodes according to an embodiment of the present disclosure.

An exemplary flowchart illustrating determining a master node and one or more slave nodes according to an embodiment of the present disclosure shown in FIG. 5 may include:

51, receiving a first pairing information sent by a mobile terminal by the plurality of nodes.

In the embodiment of the present disclosure, a mobile terminal such as a mobile phone can be used for scanning and determining a status of each node in the network system, sending the first pairing information to each node, and then, connecting the master node as the target master node in the network system.

Specifically, an operation can be performed by an APP on the mobile phone. When using the APP on the mobile phone to operate, it scans the status of each node in the network system and confirms whether each node is an initial master node or not. If the network system comprises multiple initial master nodes, one of the multiple initial master nodes will be selected as the target master node to be connected this time, and then, the first pairing information will be sent to each node in the network system, that is, each node will receive the first pairing information. And in the embodiment of the present disclosure, when actually using the APP on the mobile phone for time code synchronization, there is only one master node in the network system, that is, the target master node. The target master node is one initial master node rather than multiple initial master nodes.

Figure 6:
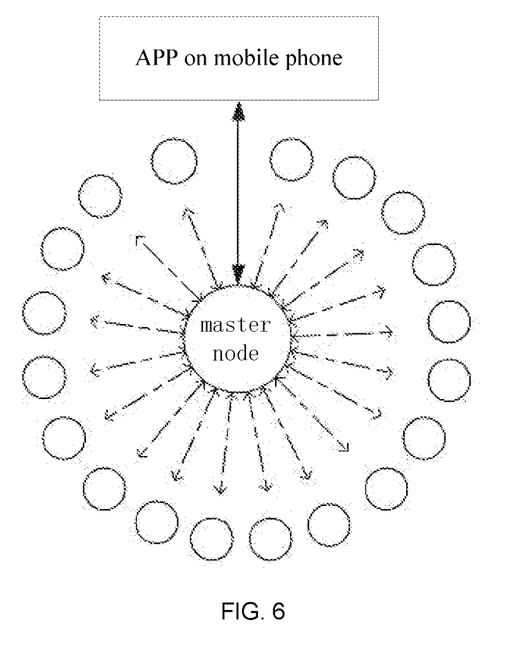
FIG. 6 is an exemplary diagram illustrating a network system according to another embodiment of the present disclosure.

An exemplary diagram illustrating a network system according to another embodiment of the present disclosure is shown in FIG. 6. In FIG. 6, a central point of the network system is a master node M (same as master M), and points on an arc are slave nodes S (same as the slave S); the APP on the mobile phone is directly connected to the master node through a BLUETOOTH module and can be operated to control the master node.

It should be noted that, in the embodiment of the present disclosure, the first pairing information is sent by the APP on the mobile phone and is used to connect the APP on the mobile phone with the target master node in the network system. After the APP on the mobile phone is connected to the target master node, the target master node can be controlled through the APP on the mobile phone. And in the embodiment of the present disclosure, a node may correspond to a terminal device including, but not limited to, a mobile phone, a computer, and the like; therefore, nodes are connected to each other to form a network system, which is actually connections among terminal devices. And the APP on the mobile phone is connected to the master node through the BLUETOOTH module. That is, the APP on the mobile phone is connected to a terminal device corresponding to the master node through its own BLUETOOTH module.

52, determining respectively by the plurality of nodes whether they themselves are a target master node or not according to the first pairing information, wherein the target master node is the initial master node.

In the embodiment of the present disclosure, users can select the master node to be connected through the APP on the mobile phone, and the APP on the mobile phone will generate the first pairing information and send it to the plurality of nodes in the network system. If a node can be connected to the APP on the mobile phone according to the first pairing information, the node connected to the APP on the mobile phone is the target master node. And in embodiments of the present disclosure, when the APP on the mobile phone is used for connection, only one target master node is connected with the APP on the mobile phone, and multiple target master nodes do not exist in the network system; the target master node connected to the APP on the mobile phone is an initial master node.

53, sending a dissolution command to other initial master nodes by the target master node.

When time code synchronization is actually performed, the master node is only one initial master node, that is, the APP on the mobile phone will only connect to one initial master node, and will not connect to multiple initial master nodes; therefore, the target master node will send a dissolution command to the other initial master nodes, and rebuild the network system. Specifically, the target master node will generate the dissolution command and send it to all the other initial master nodes except itself. After receiving the command, the other initial master nodes will dissolve their corresponding initial network systems according to the dissolution command. That is, in the embodiment of the present disclosure, the dissolution command is mainly used to dissolve the initial network systems corresponding to the other initial master nodes except the target master node.

54, updating the other initial master nodes as first slave nodes according to the dissolution command.

After the APP on the mobile phone establishes a connection with the target master node through BLUETOOTH and the like, the APP on the mobile phone will prompt the target master node to dissolve the initial network systems corresponding to the other initial master nodes and rebuild network systems. And after receiving the command, the other initial master nodes will dissolve the initial network systems in which they are located; and the other initial master nodes will be updated as first slave nodes according to the dissolution command.

And an initial network system corresponding to the target master node is the target network system, and a second slave node originally in the target network system is still a slave node in the new network system. Meanwhile, a third slave node in the initial network system corresponding to the other initial master node (i.e., the first slave node) is also a slave node in the new network system. That is, the one or more target slave nodes in the generated new network system comprises the first slave node, the second slave node in the target network system, and the third slave node corresponding to the first slave node (i.e., the other initial master node).

In the above embodiment, after determining the target master node and the one or more target slave nodes in the network system, the target master node and the one or more target slave nodes may be paired to construct a new network system. Specifically, the one or more target slave nodes receive a second pairing information from the target master node to pair the target master node with the one or more target slave nodes to obtain a new network system. That is, in the embodiment of the present disclosure, the second pairing information is used to connect the target master node and the one or more target slave nodes in the new network system.

After the target slave node receives the second pairing information and performs pairing, the target master node also needs to generate and send verification information to the one or more target slave nodes to verify whether the new network system is successfully established. Specific process of constructing the network system and specific steps of verifying whether the network system being successfully established may be obtained by referring to the prior art, and are not limited here.

In some other embodiments of the present disclosure, in a network system where the target master node and one or more target slave nodes have been determined, the following may be further performed: randomly selecting a node among the one or more target slave nodes as a new target master node, if the target master node in the network system is disconnected.

Specifically, if the network system has been constructed, the network system now includes one target master node and at least one target slave nodes. If the target master node is disconnected during time code synchronization, the master node is lost in the network system and time code synchronization cannot be performed. A master node can be customized among one or more target slave nodes in the network system as a new target master node in the network system; the new target master node will build a new network system with the rest of the one or more target slave nodes.

It should be noted that, in the embodiment of the present disclosure, when the target master node is disconnected, the APP can be used to customize the new target master node among the one or more target slave nodes; or the user can use the APP to self-select a node as the target master node.

In other embodiments of the present disclosure, there may be only slave nodes in the network system, and when the APP needs to connect with the master node in the network system, the APP may customize a node among the slave nodes as the target master node of the network system.

Figure 7:
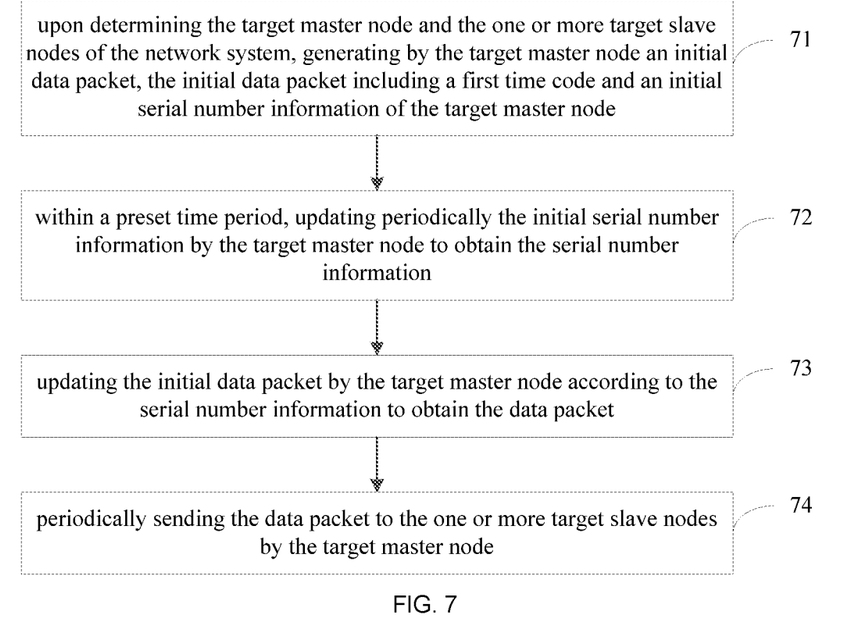
FIG. 7 is an exemplary flowchart illustrating sending a data packet according to an embodiment of the present disclosure.

An exemplary flowchart illustrating sending a data packet according to an embodiment of the present disclosure is shown in FIG. 7, which may include:

71, upon determining the target master node and the one or more target slave nodes of the network system, generating by the target master node an initial data packet, the initial data packet including a first time code and an initial serial number information of the target master node.

Specifically, the target master node in the network system may generate an initial data packet, wherein the initial data packet includes a first time code corresponding to the target master node at this time, and also includes initial serial number information corresponding to the initial data packet.

Wherein, the first time code is usually corresponding time when the target master node generates the initial data packet; the serial number information may represent a number of data packets or a number of times the target master node generates the data packet.

72, within a preset time period, updating periodically the initial serial number information by the target master node to obtain the serial number information.

Normally, the target master node may not always send data packets, but may only generate data packets within a certain preset period of time and send them to the one or more target slave nodes for time code synchronization. The data packet includes serial number information, and corresponding serial number information of different data packets is also different.

73, updating the initial data packet by the target master node according to the serial number information to obtain the data packet.

When the network system needs to synchronize the time code, the target master node will generate a data packet and periodically send it to all slave nodes in the network system within a preset time period. When the target master node generates an initial data packet for the first time, the initial data packet includes a first time code and an initial serial number corresponding to the target master node; the target master node will send the initial data packet to the one or more target slave nodes.

In order to prevent the one or more target slave nodes from not receiving the data packet due to packet loss, the target master node periodically sends a new data packet to the one or more target slave nodes; however, corresponding serial numbers in the data packet sent each time are different.

Specifically, each time the target master node sends a data packet, it will update serial number information to obtain new serial number information, and update the new serial number information to the data packet to obtain a new data packet sent each time. That is, in the embodiment of the present disclosure, the first time codes in the data packet sent by the target master node are same, but the serial number information is different; when the target master node sends out a data packet, the serial number information in an original data packet is replaced by the newly generated serial number information, and the data packet can be updated.

74, periodically sending the data packet to the one or more target slave nodes by the target master node.

When the serial number information is periodically updated, the target master node may also periodically send the updated data packet to the one or more target slave nodes. Moreover, in the embodiment of the present disclosure, any two adjacent data packets are sent with a preset buffer time interval.

That is, the data packet is periodically sent to the one or more target slave nodes after a preset buffer time interval; and after receiving the data packet, the one or more target slave nodes perform time code synchronization according to the data packet.

Figure 8:
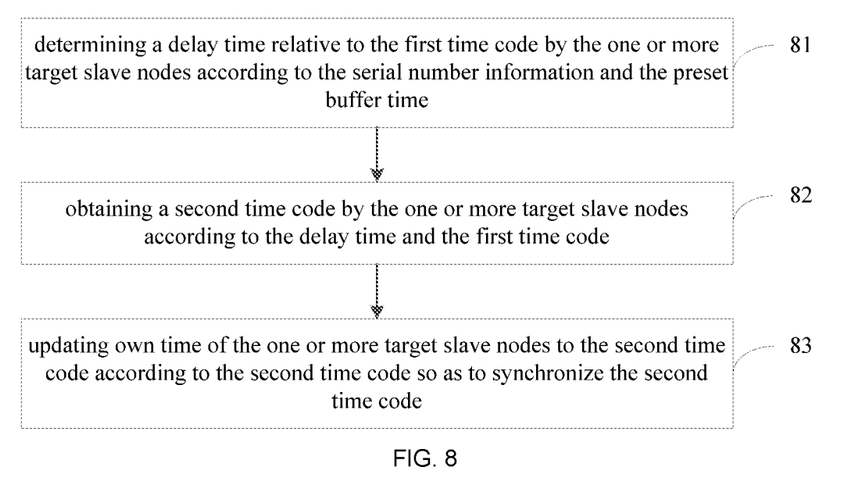
FIG. 8 is an exemplary flowchart illustrating synchronizing a second time code by a slave node according to an embodiment of the present disclosure.

An exemplary flowchart illustrating synchronizing a second time code by a slave node according to an embodiment of the present disclosure is shown in FIG. 8. In the embodiment of the present disclosure, compensating the first time code according to the serial number information to obtain a second time code and synchronizing the second time code may include:

81, determining a delay time relative to the first time code by the one or more target slave nodes according to the serial number information and the preset buffer time.

Since time is also changing during transmission of the data packet, time when the one or more target slave nodes receive the data packet is actually later than corresponding time in the data packet (i.e., the first time code in the data packet). Therefore, in the embodiment of the present disclosure, the serial number information can be used to confirm time required for the one or more target slave nodes to receive the data packet, so as to determine time corresponding to the data packet received by the one or more target slave nodes.

In the embodiment of the present disclosure, the serial number information actually represents a number of data packets, that is, the number of times the target master node generates the data packets. In addition, since any two adjacent data packets are sent with an internal of the preset buffer time, there is corresponding relationship between the number of data packets and a number of buffer times. Specifically, the number of data packets is equal to the number of buffer times plus 1. In a specific embodiment, after the target master node sends a second data packet, there will be a buffer time between the first data packet and the second data packet; at this time, the serial number information corresponding to the second data packet is 2 (i.e. the number of data packets is 2), and the number of buffer times is 1; the number of data packets being 2 is equal to the number of buffer times being 1 plus 1.

Therefore, the number of buffer times can be determined according to the number of data packets, that is, according to the serial number information, and then, delay time when the one or more target slave nodes actually receive the data packets compared with the first time code can be determined.

82, obtaining a second time code by the one or more target slave nodes according to the delay time and the first time code.

When the one or more target slave nodes receive the data packet, they can determine the serial number information corresponding to the data packet, that is, can determine delay time compared to the first time code when the one or more target slave nodes receive the data packet. And after the delay time is determined, the one or more target slave nodes may update the first time code to obtain a second time code.

In some embodiments of the present disclosure, the second time code may be a sum of the first time code and the delay time, that is, the second time code=the first time code+the delay time.

In other embodiments of the present disclosure, the first time code and the delay time may be calculated in other ways, which is not limited here.

83, updating own time of the one or more target slave nodes to the second time code according to the second time code so as to synchronize the second time code.

The one or more target slave nodes updates their own time to the second time code to achieve the time code synchronization between the master node and the one or more slave nodes.

It should be noted that, in the embodiment of the present disclosure, time required for a node to generate and send the data packet and to receive the data packet is not considered.

In a specific embodiment of the present disclosure, the target master node M repeatedly sends a broadcast command to the one or more target slave nodes every 100 ms, and the time code information in a repeatedly sent broadcast data packet remains unchanged. For example, the time code information may be 12:00:00:00, that is, the first time code is 12:00:00:00, and the preset buffer time is 100 milliseconds (ms). At this time, the initial data packet generated by the target master node may be: 12:00:00:00|1, wherein 1 is the initial serial number information, representing that the number of data packets at this time is 1, or that the target master node has generated only one data packet.

If a certain target slave node receives a tenth data packet sent by the target master node, the data packet generated and sent by the target master node at this time is: 12:00:00:00|10. That is, in the embodiment of the present disclosure, the data packet sent by the target master node may be 12:00:00:00|n; wherein 12:00:00:00 is the first time code, and n is the number of data packets, or the number of times that the target master node generates the data packets.

When the data packet is 12:00:00:00|10, it indicates that the one or more target slave nodes receives the tenth data packet, and the time has passed: 10 (serial number)×100 ms=1 second(s); then time in the network system is actually 12:00:01:00 at this time, that is, the second time code should be 12:00:01:00; the time that the one or more target slave nodes need to synchronize is 12:00:01:00.

It should be noted that, in the embodiment of the present disclosure, the target master node sends the data packet to all the target slave nodes in the network system periodically within a preset time period. And after the one or more target slave nodes receive the data packet sent by the target master node, the one or more target slave nodes realize time code synchronization according to the data packet. And the one or more target slave nodes also generate synchronization confirmation information and feed it back to the target master node. The target master node receives the synchronization confirmation information from the one or more target slave nodes and determines that the one or more target slave nodes successfully realize the time code synchronization.

The synchronization confirmation information also includes serial number information to confirm time when the one or more target slave nodes receive the data packet.

In the above embodiment, if the target master node receives the synchronization confirmation information from the one or more target slave nodes, the target master node stops sending the data packet within the preset time period.

Specifically, since the target master node simultaneously sends the data packet to all target slave nodes in the network system, when the target master node confirms that the one or more target slave nodes have received the data packet, the target master node does not send the data packet to the one or more target slave nodes that have received the data packet and performed the time code synchronization. This is to avoid that the target master node performs time code synchronization many times when sending data packets subsequently, which may cause large errors.

Figure 9:
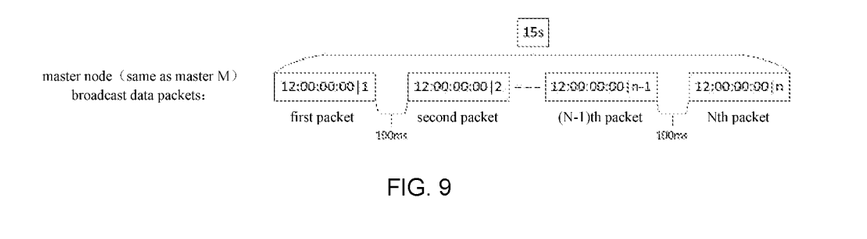
FIG. 9 is an exemplary diagram illustrating a data packet according to an embodiment of the present disclosure.

An exemplary diagram illustrating a data packet according to an embodiment of the present disclosure is shown in FIG. 9. In the embodiment shown in FIG. 9, the first time code is 12:00:00:00, that is, at 12:00:00:00 the target master node generates the initial data packet, which is 12:00:00:00|1. The preset time period may be 15 s, that is, the one or more target slave nodes periodically send data packets to the one or more target slave nodes within 15 s. And any two adjacent data packets are sent with a 100 ms interval. At this time, the data packet sent by the target master node is shown in FIG. 9. If the one or more target slave nodes successfully receive the tenth data packet, that is, the received data packet is 12:00:00:00|10, the first time code is updated according to the second data packet, so that an obtained second time code is: 12:00:01:00; the one or more target slave nodes update their time to 12:00:01:00 to achieve the time code synchronization between the master node and one or more slave nodes.

In the above embodiment, if the target master node does not receive the synchronization confirmation information from the one or more target slave nodes within the preset time period, it may be considered that the one or more target slave nodes have not successfully synchronized. At this point, a prompt message may be generated to prompt that operation of manual synchronization should be performed, or to confirm failure of the one or more target slave nodes that have not successfully synchronized.

An embodiment of the present disclosure mainly provides a network system, which comprises a target master node and one or more target slave nodes, wherein the target master node is used for periodically sending data packets to the one or more target slave nodes, the data packet includes a first time code and a serial number information of the target master node, the one or more target slave nodes are used for compensating the first time code according to the serial number information to obtain a second time code, and the one or more target slave nodes are used for synchronizing the second time code using the first time code and the serial number information.

In the network system provided by the embodiment of the present disclosure, the master node periodically sends to one or more slave nodes a data packet including the first time code and the serial number information that need to be synchronized, the one or more slave nodes determine actual corresponding second time code when the one or more slave nodes receive time code according to the serial number information, and the one or more slave nodes synchronize the second time code to realize time code synchronization between the master node and the one or more slave nodes. Therefore, the problem can be avoided that time codes cannot be synchronized due to the fact that time code information is lost when the master node performs time code synchronization.

In the above embodiments, description of each embodiment has its own emphasis. For parts that are not described in detail in a certain embodiment, one may refer to detailed descriptions of other embodiments as above, which will not be described herein again.

In specific implementation, each of the above units or structures can be implemented as an independent entity, or can be combined arbitrarily to be implemented as same or several entities. For specific implementation of each of the above units or structures, one may refer to the previous method embodiments, which will not be described herein again.

The time code synchronization method and the network system provided by the embodiments of the present disclosure are described in detail above. Specific examples are used in this document to illustrate the principles and embodiments of the present disclosure. Description of the above embodiments is only used to help understanding a method and a core idea of the present disclosure, while those skilled in the art can obtain, according to the idea of the present disclosure, variations in specific embodiments and the scope of application, and thus, content of the present specification should not be construed as limitation to the present disclosure.

What is claimed is:

1. A time code synchronization method applied to a network system, wherein the network system comprises a plurality of nodes, and the method includes:
    determining a target master node and one or more target slave nodes of the network system among the plurality of nodes;
    upon determining the target master node and the one or more target slave nodes of the network system, periodically sending a data packet to the one or more target slave nodes by the target master node, wherein the data packet comprises a first time code and a serial number information of the target master node; and
    compensating the first time code by the one or more target slave nodes according to the serial number information to obtain a second time code, and synchronizing the second time code by the one or more target slave nodes;
    wherein the first time code in the data packet sent by the target master node is the same, and the serial number information is different.

2. The time code synchronization method of claim 1, wherein the plurality of nodes includes a plurality of initial master nodes, any one of the plurality of initial master nodes corresponds to one of initial network systems, and each of the initial network systems includes an initial master node and at least one slave node;
    determining the target master node and one or more target slave nodes of the network system among the plurality of nodes, includes:
    receiving a first pairing information sent by a mobile terminal by the plurality of nodes;
    determining respectively by the plurality of nodes whether they themselves are a target master node or not according to the first pairing information, wherein the target master node is the initial master node;
    sending a dissolution command to other initial master nodes by the target master node, wherein the other initial master nodes are other initial master nodes among the plurality of initial master nodes except the target master node; and
    updating the other initial master nodes as first slave nodes according to the dissolution command;
    wherein one of the initial network systems corresponding to the target master node is a target network system, and the one or more target slave nodes include the first slave node, a second slave node in the target network system, and a third slave node corresponding to the first slave node.

3. The time code synchronization method of claim 2, wherein upon determining the target master node and the one or more target slave nodes of the network system among the plurality of nodes, the method further includes:
    receiving a second pairing information from the target master node by the one or more target slave nodes to pair the target master node with the one or more target slave nodes to obtain a new network system.

4. The time code synchronization method of claim 3, wherein the method further includes:
    sending a verification information to the one or more target slave nodes by the target master node to verify whether the new network system is successfully established.

5. The time code synchronization method of claim 2, wherein determining the target master node and the one or more target slave nodes of the network system among the plurality of nodes includes:
    randomly selecting a node among the one or more target slave nodes as a new target master node if the target master node in the network system is disconnected.

6. The time code synchronization method of claim 1, wherein upon determining the target master node and the one or more target slave nodes of the network system, the periodically sending the data packet to the one or more target slave nodes by the target master node includes:
    upon determining the target master node and the one or more target slave nodes of the network system, generating by the target master node an initial data packet, the initial data packet including the first time code and an initial serial number information of the target master node;
    within a preset time period, updating periodically the initial serial number information by the target master node to obtain the serial number information;
    updating the initial data packet by the target master node according to the serial number information to obtain the data packet; and
    periodically sending the data packet to the one or more target slave nodes by the target master node;
    wherein any two adjacent data packets are sent with a preset buffer time interval;
    the data packet includes the first time code and the serial number information of the target master node.

7. The time code synchronization method of claim 6, wherein the compensating the first time code by the one or more target slave nodes according to the serial number information to obtain the second time code and synchronizing the second time code by the one or more target slave nodes includes:
    determining a delay time relative to the first time code by the one or more target slave nodes according to the serial number information and the preset buffer time;
    obtaining the second time code by the one or more target slave nodes according to the delay time and the first time code; and
    updating own time of the one or more target slave nodes to the second time code according to the second time code so as to synchronize the second time code.

8. The time code synchronization method of claim 6, wherein the method further includes: receiving a synchronization confirmation information from the one or more target slave nodes by the target master node to determine that the one or more target slave nodes successfully synchronizes the second time code;

wherein, the synchronization confirmation information includes the serial number information.

9. The time code synchronization method of claim 8, wherein the method further includes:

if receiving the synchronization confirmation information from the one or more target slave nodes by the target master node, stopping sending the data packet by the target master node within the preset time period.

* * * * *